(12) United States Patent
Lee

(10) Patent No.: US 6,230,063 B1
(45) Date of Patent: May 8, 2001

(54) FACTORY MODE FREE SETTING APPARATUS AND METHOD THEREOF

(75) Inventor: Ji-Young Lee, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/495,117

(22) Filed: Feb. 1, 2000

Related U.S. Application Data

(63) Continuation-in-part of application No. 08/676,496, filed on Jul. 8, 1996, now Pat. No. 6,134,575.

(30) Foreign Application Priority Data

Jul. 7, 1995 (KR) ................................................ 95-19928

(51) Int. Cl.$^7$ ................................................ G05B 15/00
(52) U.S. Cl. ........................... 700/83; 345/508; 345/511; 455/12.1; 455/67.3; 455/20; 358/1.6; 358/1.17; 358/1.18
(58) Field of Search .............................. 700/83; 345/508, 345/511; 455/12.1, 569, 67.3, 20; 358/1.6, 1.17, 1.18; 324/601

(56) References Cited

U.S. PATENT DOCUMENTS

| | | | |
|---|---|---|---|
| 4,876,737 | 10/1989 | Woodworth et al. | 455/12.1 |
| 5,093,726 | 3/1992 | Chun | 348/565 |
| 5,122,790 | 6/1992 | Yasuda et al. | 345/96 |
| 5,226,822 | 7/1993 | Morris | 434/359 |
| 5,407,337 | 4/1995 | Cutler | 434/335 |
| 5,438,614 | 8/1995 | Rozman et al. | 379/93.08 |
| 5,442,146 | 8/1995 | Bell et al. | 177/210 FP |
| 5,485,553 * | 1/1996 | Kovalick et al. | 358/1.6 |
| 5,485,554 * | 1/1996 | Lowitz et al. | 358/1.17 |
| 5,524,281 * | 6/1996 | Bradley et al. | 455/67.3 |
| 5,654,738 | 8/1997 | Spurlock | 345/132 |
| 5,677,732 | 10/1997 | Moon | 348/190 |

OTHER PUBLICATIONS

S.J. Bailey, "From Desktop to Plant Floor, A CRT is the Control Operator's Window on the Process", Control Engineering / pp. 86–90.

Nakamura et al., "A Fault Diagnosis System Based on Parallel Interation", IEEE, pp. 100–105.

* cited by examiner

Primary Examiner—William A. Cuchlinski, Jr.
Assistant Examiner—McDieunel Marc
(74) Attorney, Agent, or Firm—Robert E. Bushnell, Esq.

(57) ABSTRACT

A technique for collectively setting a factory mode of operation of a monitor offers adjustments or modifications for particulars of mode data to meet user requirements, by transmitting a set of factory mode timing data from an external controller to an electrically erasable programmable read only memory using a serial interface data communication. A factory mode data transmission process includes the steps of transmitting a start data signal to a microcomputer in a monitor when a storage key input is fed to the external controller, repeatedly sending the timing data until a mode end signal is input and sending a mode end data to the microcomputer when a mode end signal is input. In addition, a factory mode data receiving process includes the steps of sending back the start data received to the external controller, storing mode timing data received into a factory mode address reserved in a memory in the monitor and ending the reception of mode timing data when mode end data is inputted. Consequently, any operation mode according to user requirements is able to be set in a monitor, without modifying a pre-installed program in a microcomputer housed therein, at a low cost.

31 Claims, 7 Drawing Sheets

FACTORY MODE FREE SETTING APPARATUS AND METHOD THEREOF

CROSS-REFERENCE TO RELATED APPLICATIONS

This application is a continuation-in-part of Applicant's Ser. No. 08/676,496, filed in the U.S. Patent & Trademark Office on Jul. 8, 1996 now U.S. Pat. No. 6,134,575 issued on Oct. 17, 2000.

CLAIM OF PRIORITY

This application makes reference to, incorporates the some herein, and claims all benefits accruing under 35 U.S.C. §119 and §120 by virtue of a patent application earlier filed in the Korean industrial Property Office on Jul. 7, 1995 entitled FACTORY MODE SETTING APPARATUS AND METHOD THEREOF which was duly assigned Serial No. 95-19928 by that Office.

BACKGROUND OF THE INVENTION

The present invention relates in general to an apparatus and method for setting factory modes of operation in a monitor and more particularly, to an apparatus and method for free setting the operating modes of a monitor by writing factory mode timing data transmitted from an external controller into a memory device by way of operation of a microcomputer housed therein, thereby providing an adjustable operation mode setting that is responsive to user requirement.

Factory mode adjustment is a comprehensive technical terms generally accepted in the arts, and refers to a pre-arrangement of adjusting various parameters required for proper operation of a monitor when delivered from a warehouse for a user's convenience. In consequence, when a monitor is placed in a powered on state, the screen size of a display is displayed on the screen of a monitor according to preset user mode data when prearranged by user adjustment; otherwise, a factory mode setting is then displayed.

SUMMARY OF THE INVENTION

It is therefore an object of the present invention to provide an apparatus and method for setting in a monitor, an operating mode selected by user interaction with an external controller.

It is another object to provide an apparatus and method for setting factory mode adjustment by transferring data including factory mode timing data from an external controller to an electrically erasable programmable read only memory by operation of a microcomputer housed in a monitor, by way of either serial interface communication or inter-integrated circuit bus communication, thereby enabling a monitor to visually display a view illustration a factory mode adjustment in response to user requirements.

It is still another object to provide an apparatus and method for allowing a product manufacturer or a product user to change a factory mode timing data stored in a memory of the monitor or an external controller.

A factory mode free setting apparatus constructed according to the principles of the present invention incorporates an external controller for transmitting factory mode timing data stored in a memory thereof to a memory device in a monitor for storage, and a monitor for storing such data in its memory responsive to control signals generated by the external controller.

A process for setting a factory mode of operation of a monitor according to the principles of the present invention is contemplated with the steps of providing transmitting and receiving of factory mode data between external controller and monitor. During the factory mode data transmission, factory mode start data is transmitted to a microcomputer housed in a monitor when a factory mode storage key signal is input at an input terminal of an external controller, factory mode timing data being transmitted to the microcomputer until a factory mode end key signal is input at the terminal when the result of a comparison of factory mode start data communication exchanged between the external controller and the microcomputer is favorable and transmitting to the microcomputer a factory mode end data signal when factory mode end key signal is input at the terminal.

During the factory mode reception associated with this factory mode transmission, factory mode start data is received therefrom, received factory mode timing data transmitted from external controller is stored in factory mode addresses provided in a memory in a monitor and reception of terminal mode timing data is ended when factory mode end data is received at an input terminal of microcomputer in a monitor.

The factory mode setting apparatus includes an external controller generating factory mode timing data input by a product manufacturer and a monitor device receiving the factory mode timing data and displaying a picture corresponding to the factory mode timing data.

The factory mode setting method includes the steps of inputting a factory mode timing data into the external controller by the manufacturer or the user, transmitting starting data from the external controller to the microprocessor of the monitor, transmitting the starting data received by the microprocessor of the monitor back to the external controller, making a first determination of whether the starting data transmitted by external controller is identical to the starting data transmitted from the microprocessor of the monitor to the external controller, transmitting factory mode timing data from the external controller to the microprocessor on the basis of the first determination, transmitting the factory mode timing data received by the microprocessor of the monitor back to the external controller, making a second determination of whether the factory mode timing data transmitted by external controller is identical to the factory mode timing data transmitted back to the external controller from the microprocessor of the monitor, transmitting a factory mode timing data from the external controller to the microprocessor of the monitor and storing the factory mode timing data in a main memory of the monitor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

In the following detailed description, many specific details are set forth to provide a more through understanding of the present invention. It will be apparent, however, to those skilled in the art, that the present invention may be practiced without specific details. In other instances, well known circuit components have not been described so as not to obscure the present invention.

DETAILED DESCRIPTION OF THE PREFERRED EMBODIMENT

Figure 1:
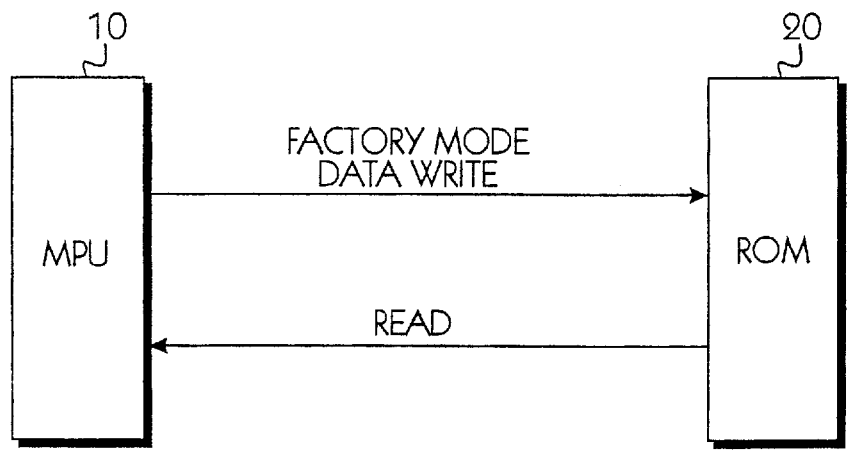
FIG. 1 is a schematic block diagram illustrating a portion of conventional factory mode setting circuitry.

Turning now to the drawings, a representation of an exemplary design for an apparatus for setting a factory mode of operation of a monitor is illustrated in block form in FIG. 1. Timing data for such as, for example, horizontal and vertical frequencies and horizontal and vertical polarities, are set in microcomputer 10 and stored in read only memory 20. Factory mode data are preset by masking in a read only memory 20 associated with microcomputer 10, and are therefore permanently available and serve as firmware in a microprocessor unit. On occasions, different factory mode data from those stored in memory 20 associated with the microprocessor 10 are required to meet user demand. For example, in the instance of an operating mode of a monitor in which the particulars masked in a read only memory ROM 20 in the mode are:

50 kHz<horizontal Frequency≦60 kHz; Vertical Frequency<65 Hz, mode 5

50 kHz<horizontal Frequency≦60 kHz: Vertical Frequency≧65 Hz, mode 6 and if the particulars of a user mode are:

Horizontal frequency 56 kHz, Vertical Frequency 70 Hz, mode 5

Horizontal frequency 58 kHz, Vertical Frequency 76 Hz, mode 6 then when displayed, a problem occurs in operation mode 5, creating distortion of a display or alternatively displaying unwanted size of view, thereby presenting a problem. In the conventional technique however, a masking of read only memory ROM 20 for data storage in addresses as well as a program for operating preset a factory mode are subject to change for another mode of operation.

In changing a factory mode preset in microcomputer 10, a masking of a read only memory requites substantial time at a relatively high cost.

Figure 2A:
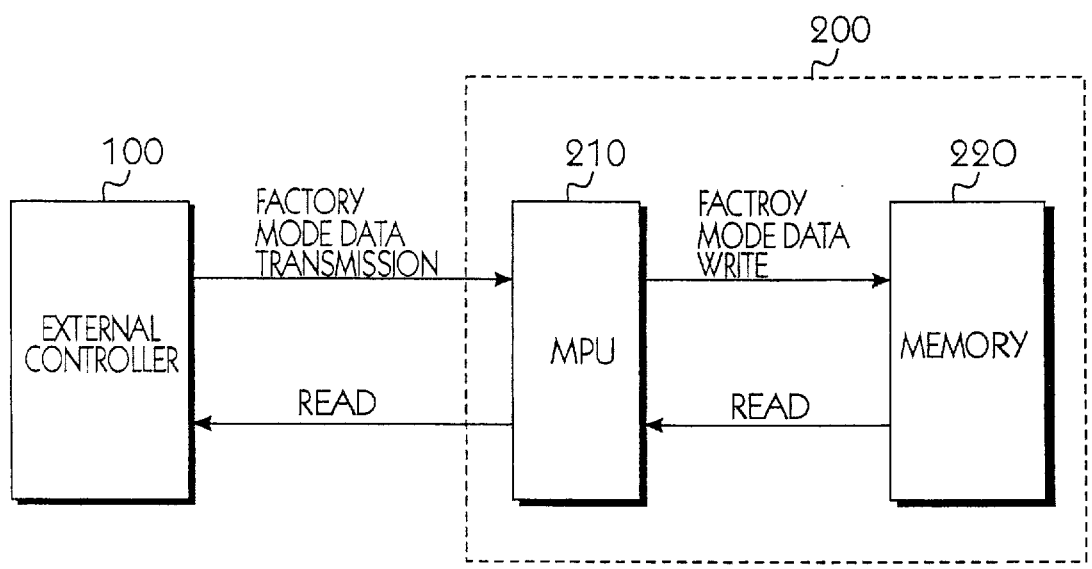
FIGS. 2A and 2B are schematic block diagrams illustrating factory mode setting apparatus of one embodiment constructed according to the principle of the invention.

Referring now FIG. 2A, one preferred embodiment according to the present invention is illustrated in block form.

External controller 100 for externally adjusting the particulars of the operational mode of a monitor, transmits to monitor 200 factory mode timing data comprising horizontal and vertical synchronizing frequencies, resolution parameters and information data by way of either a serial interface of alternatively an Inter-integrated Circuit Bus I²C communication protocol.

A memory provided in the external controller 100 stores factory mode timing data and information data, etc. in response to user requirements. Monitor 200 writes a received factory mode timing data from external controller 100 into a memory incorporated therein, or alternatively reads out either one of factory mode data or user mode data from the memory.

The memories are provided with addresses for both reserved areas for factory mode data and user mode data.

As a result, an adjustment of the factory mode timing data stored in a memory in the external controller 100 may cause a change of timing data for an operation mode of a monitor without modification of a program in a microcomputer housed therein.

Figure 2B:
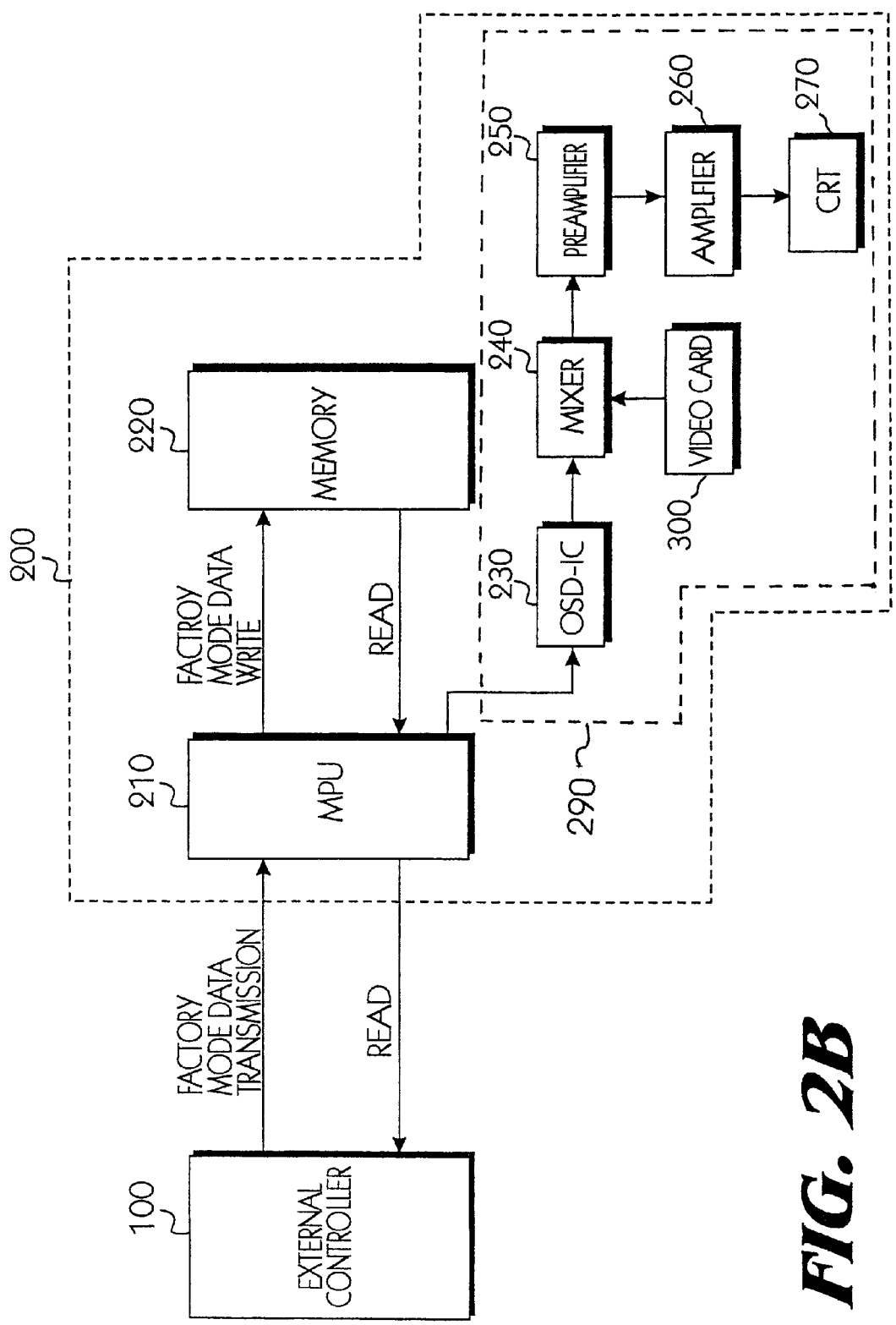

Another preferred embodiment according to the present invention is illustrated in FIG. 2B. External controller 100 generates factory mode timing data when a user or a manufacturer wants to change the factory mode timing data. Monitor 200 receives factory mode timing data generated from external controller 100 and displays a picture corresponding to the factory mode timing data.

The factory mode timing data for a factory mode and a user mode includes data indicating horizontal/vertical synchronization frequency, data indicating a resolution of the picture, data representing a variety of the synchronization frequency, data representing horizontal position (H-Position) of the picture, data representing horizontal width (H-Width) of the picture, data representing vertical position (V-Position) of the picture, data representing the vertical sides (V-Size) of the picture, data indicating the compensation level of the pincushion distortion of the picture, data indicating the compensation level of the better distortion barrel of the picture, data corresponding to parallel and vertical linearity of the picture, and the data representing other information for monitor. Monitor 200 includes a microcomputer 210 receiving factory mode timing data from external controller 100 and changing a timing data stored in a memory, memory 220 storing a timing data and receiving and storing the factory mode timing data, a video stage 290 having a driving circuit 230 receiving the factory mode timing data from microcomputer 210 and generating a picture signal corresponding to the factory mode timing data, a mixer 240 mixing the picture signals from both video card 300 and driving circuit 230, and CRT 270 displaying the picture corresponding to picture signal from mixer 240. Memory 220 includes factory mode address for factory mode timing data changed by external controller and user mode address for user mode data adjusted by a user.

Figure 3A:
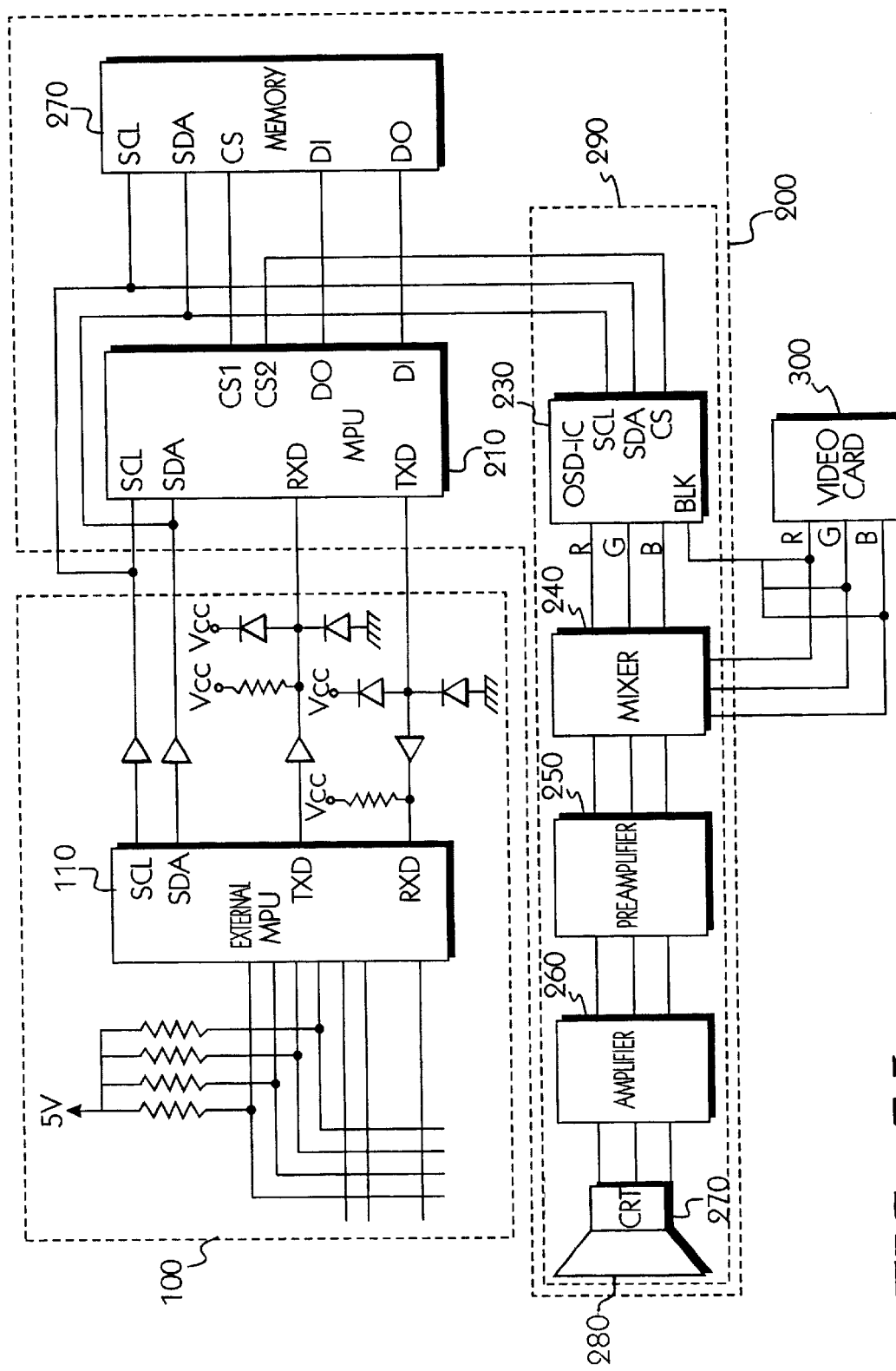
FIGS. 3A and 3B are a detailed circuit diagrams of factory mode setting apparatus of FIGS. 2A and 2B, incorporating various circuits in block form for illustrating overall construction of one referred embodiment of the present invention.

A detailed circuit diagram of FIGS. 2A and 2B in conjunction with relevant various circuits in block form is illustrated in FIG. 3A. External controller 100 comprises an external microcomputer 110 and a key input device 120 connected to a plurality of input terminals of the external microcomputer 110 for inputting a key signal caused by manipulation of a key stroke. External microcomputer 110 incorporates a memory which may be either an electrically erasable programmable read only memory EEPROM or may be alternatively connected to an externally provided memory (not shown).

External microcomputer 110 is provided with a pair of ports SCL and SDA for respectively outputting a serial clock signal and serial data signal so as to communicate with monitor 200 by using an Inter-Integrated Circuit Bus Protocol. In addition, external microcomputer 110 is also provided with input and output ports RXD and TXD so as to transfer data with monitor 200. As a result, two ways of communication are established between external microcomputer 110 and monitor 200 using either a pair of ports, SCL and SDA, or alternatively input/output ports RXD and TXD.

One of the above described two communication methods may be selected as necessary.

Monitor 200 comprises microcomputer 210 and memory 220 which typically is an electrically erasable programmable read only memory EEPROM. Microcomputer 210 has its respective ports SCL, SDA, RXD and TXD connected to corresponding ports of the external microcomputer 110. A pair of ports, SCL and SDA, chip select port CS1 and data input/output ports DI and DO of microcomputer 210 may be selected to connect to a pair of port SCL and SDA of memory 220 so as to establish an Inter-integrated Circuit Bus communication channel, or alternatively be selected to connect to chip select port CS and a pair of input/output ports DI and DO for serial data communication.

A pair of ports SCL and SDA, as well as chip select port CS2 of microcomputer 210 are respectively connected to each of corresponding ports SCL and SDA and CS and are coupled to a video stage 290 formed by On-screen Display Integrated Circuit OSD-IC 230, Mixer 240, preamplifier 250, and amplifier 260. A pair of ports SCL, SDA, and CS2 of microcomputer 210 are coupled to corresponding ports SCL, SDA, CS of an On-Screen Display Integrated Circuit OSD-IC 230, which is provided with factory mode data or user mode data from the microcomputer 210, and responsive to the data input, generates red, green, and blue component signals to mixer 240 so as to display the data on a screen of a monitor in On Screen Display state.

Mixer 240 mixes both video signals, each comprised of red R, green G, and blue B component signals, output from a video card 300 in an external computer system and On Screen Display Integrated Circuit OSD-IC 230, and its output terminals are connected to corresponding input terminals of preamplifier 250 which pre-amplifies a mixed signal input. Amplifier 260 has its input terminals connected to the output terminals of preamplifier 250 and also has its output terminals connected to input terminals of a cathode ray tube CRT 270 so as to output an amplified mixed signals.

Figure 3B:
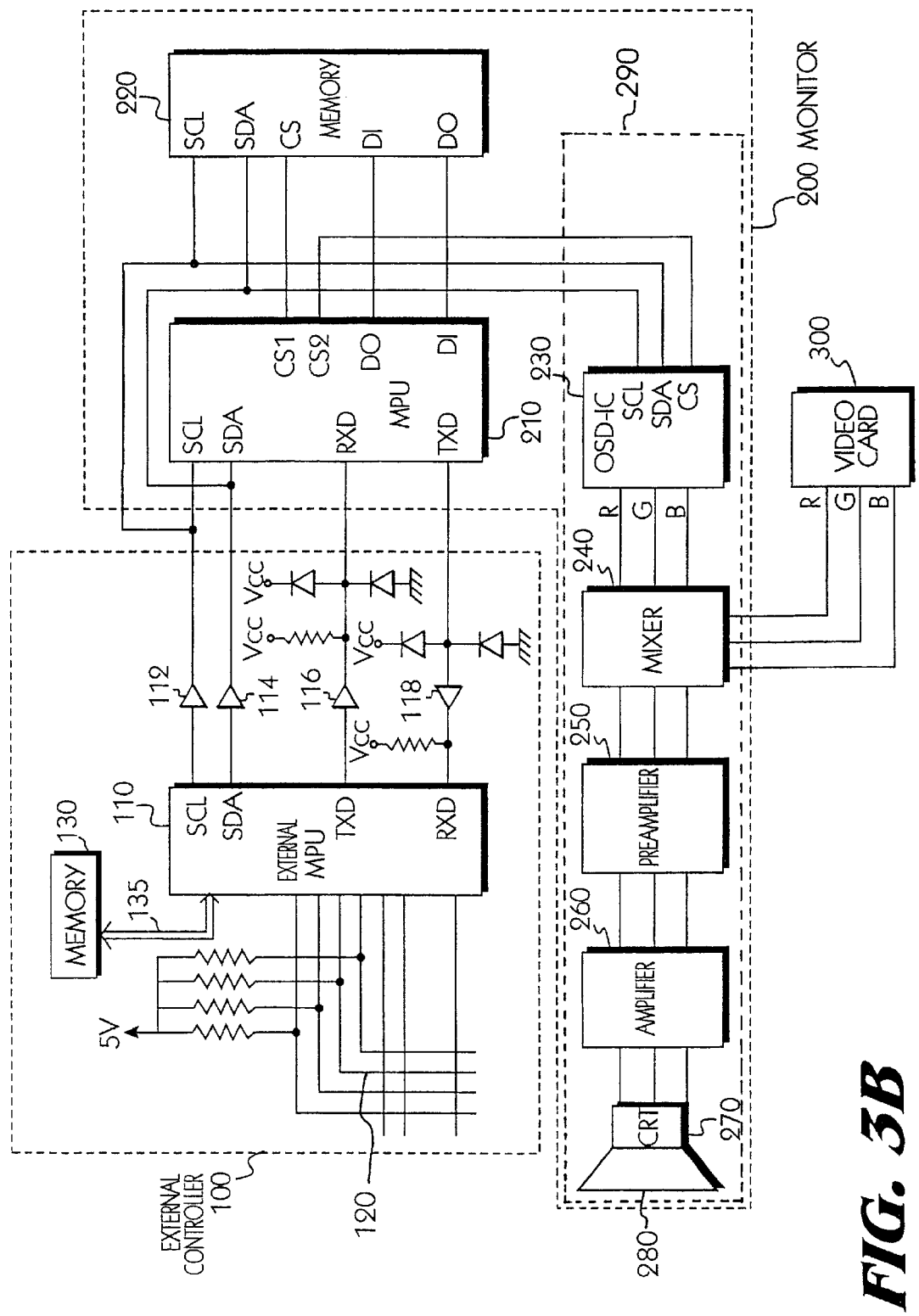

Referring to FIG. 3B, external controller 100 includes key input 120 receiving a factory mode timing data input by a product manufacturer or a user, external microcomputer 110 receiving the factory mode timing data from key input 120 and generating the factory mode timing data to the monitor 200, and memory 130 receiving and storing the factory mode timing data and other information data from external microcomputer 110 on the basis of the request by the manufacturer or the buyer.

The memory 220 and the external memory 130 are EEPROM which is able to erase and store factory mode timing data and user mode data repeatedly and selectively. The memory 220 has two addresses: factory mode address storing factory mode timing data for setting the state of the picture by product manufacturer, user mode address storing user mode data for setting the state of the picture by product user.

The port SCL, SDA, output pot TXD, and input port RXD of the external microcomputer 110 are connected to port SCL, SDA, input port RXD, and output port TXD respectively by bidirectional buffer 112 and 114 and one way buffer 116 and 118 in order to change the factory mode timing data to meet the request of product manufacturer and the product buyer without changing the program of the microcomputer 210 provided in monitor 200 by changing the factory timing data stored in external controller 100. The port SCL of external microcomputer 110 and microcomputer 210 are provided for outputting the clock in serial, and the port SDA is provided for outputting data in serial. The port SCL and SDA, chip select port CS1, data input port DI, and data output port DO of the microcomputer 210 are connected to port SCL and SDA, chip select port CS, data output port DO, and data input port DI of the memory 210 respectively in order to store in memory 220 the factory mode timing data output from microcomputer 210. The port SCL and SDA and another chip select port CS2 of the microcomputer 210 are connected to a video circuit 290 having the port SCL and SDA and chip select port SC of driving circuit for on screen 230 in order to transmit the factory mode timing signal from microcomputer 210 to the video stage 290 including OSD-IC 230. The on screen display integrated circuit OSD-IC 230 is connected to mixer 240 in order to transmit a video signal representing the factory mode timing data or user mode data and display the picture corresponding to the user mode data or factory mode timing data. Mixer 240 is connected to OSD-IC 230 and video card 300 to combine RGB signal from OSD-IC 230 with RGB signal from video card 300. The picture signal output from mixer 240 is amplified by preamplifier 250. Amplifier 260 is connected to preamplifier 250 to amplify the picture signal output from preamplifier 250. CRT 270 is connected to amplifier 260 to receive the amplified picture signal and display the picture corresponding to factory mode timing data or user mode data on screen of CRT 270.

Figure 4:
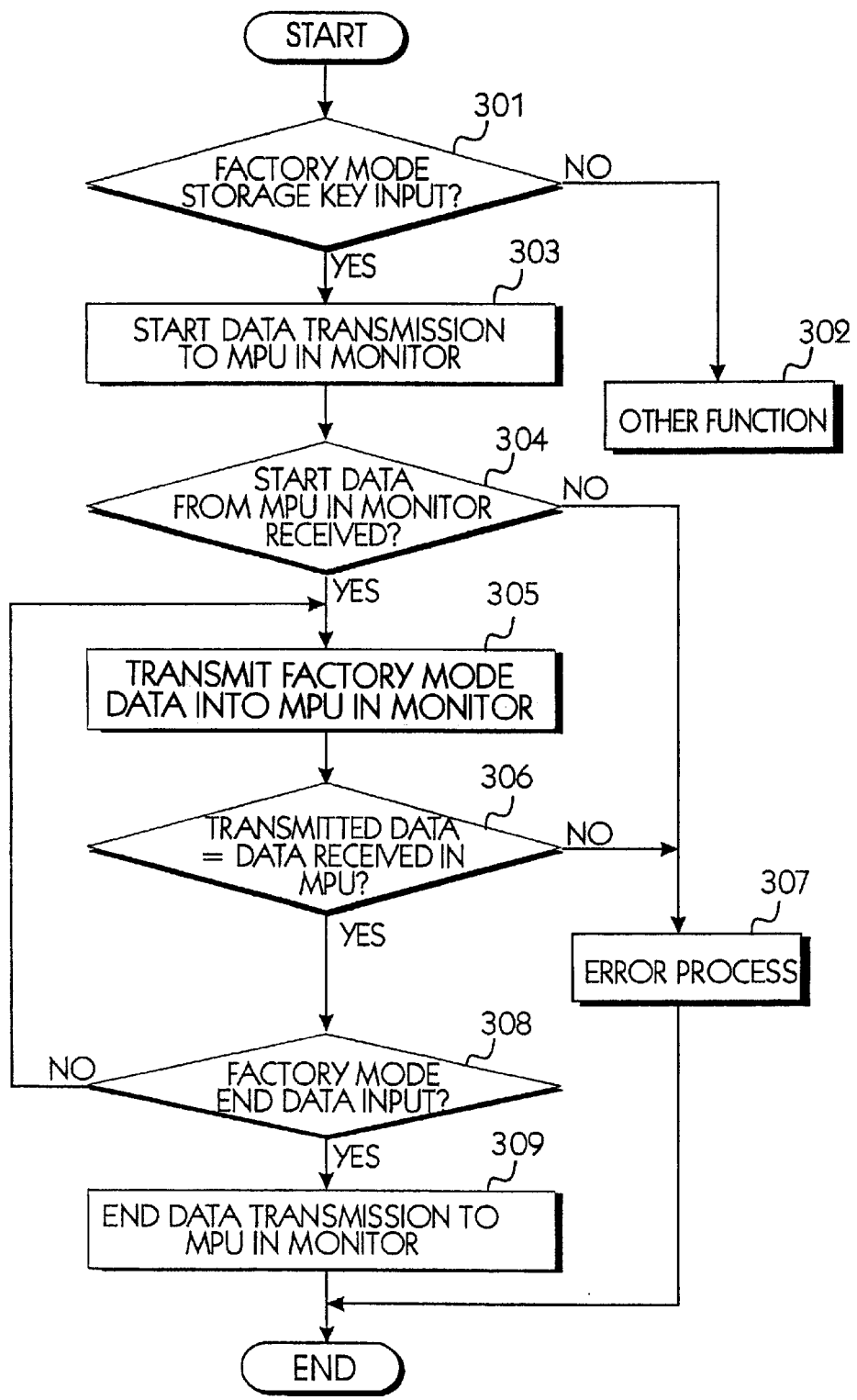
FIG. 4 is a flowchart illustrating a sequence of a process for setting a factory mode operation executed in an external controller on accordance with a preferred embodiment of the present invention incorporating a factory mode setting apparatus.
Figure 5A:
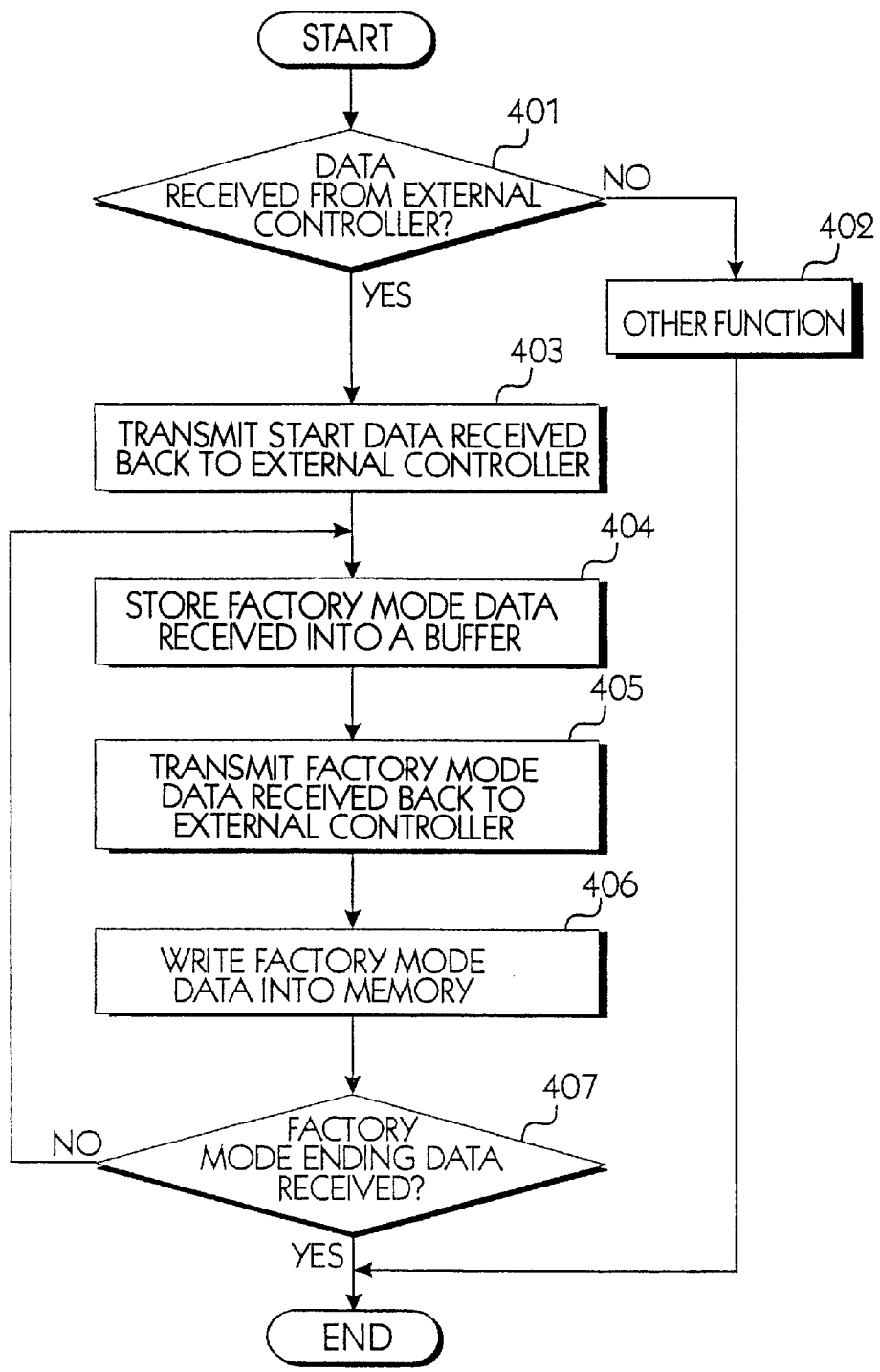
FIGS. 5A and 5B are flowcharts illustrating a sequence of a process for setting a factory mode of operation executed in a monitor in accordance with a preferred embodiment of the present invention incorporating a factory mode setting apparatus.
Figure 5B:
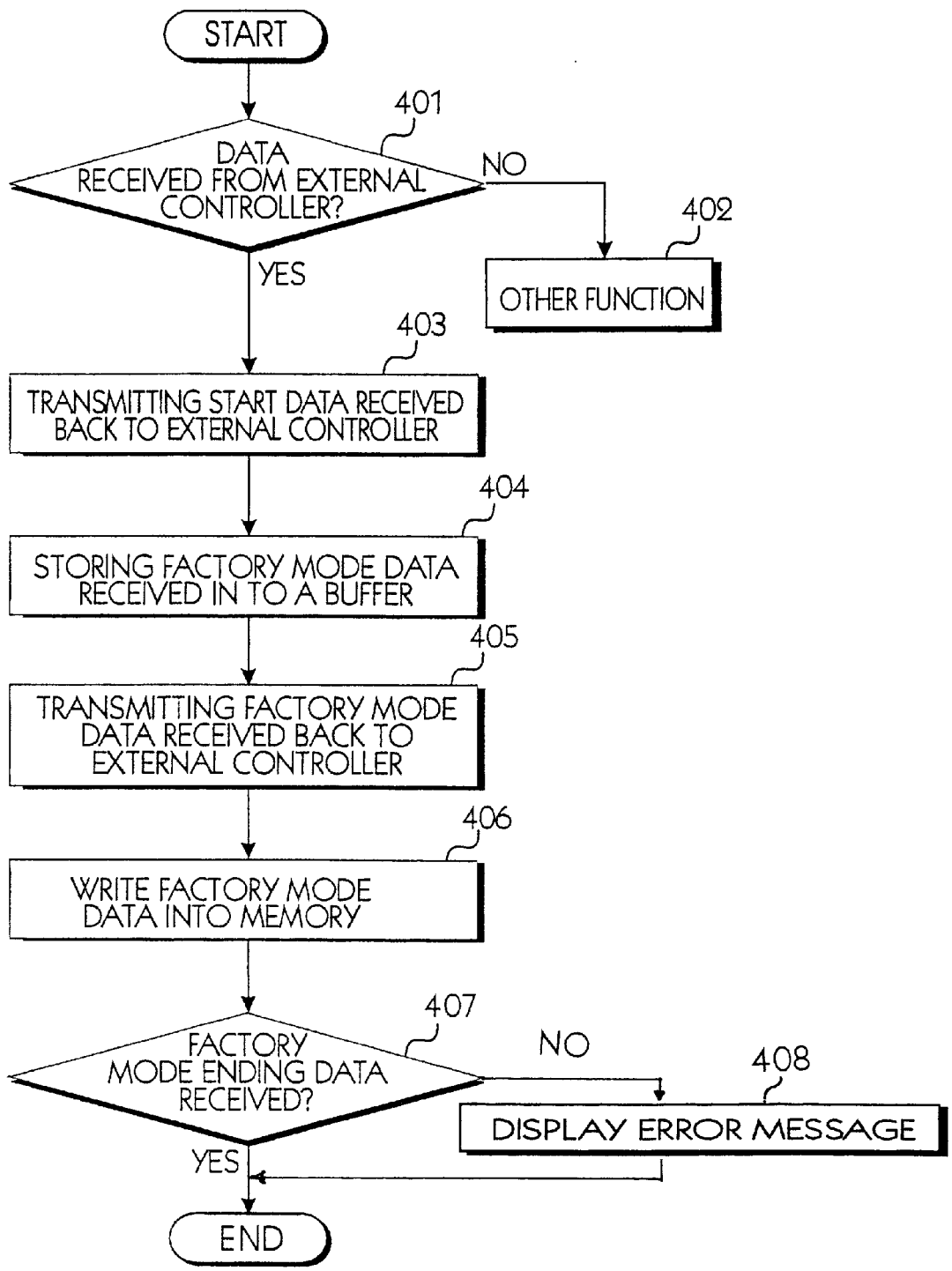

FIG. 4 is a flowchart illustrating a sequence of operational processes performed by the microcomputer 110 in the external controller 100, whereas FIGS. 5A and 5B illustrate processes performed by the microcomputer 210 in the monitor 200.

A factory mode storage key signal is supplied to an input terminal of the external microcomputer 110 by a key stroke manipulation of the key input device 120 in the external controller 100 in step 301. The external microcomputer 110 transmits, to the microcomputer 210 in the monitor 200, a factory mode start data, for example, a signal indicative of OAAH in hexadecimal code in step 303. The clock signal is transmitted from the port SCL of external microcomputer 110 to the port SCL of microcomputer 210 by using I²C (inter-integrated circuit bus) communication protocol while the factory mode starting data synchronized by the clock signal is transmitted from external microcomputer 110 to the microcomputer 21 through the port SDA. The external microcomputer 110 may select any one of a pair of ports, SCL and SDA or RXD and TXD, for data transmission. When employing the Inter-Integrated Circuit Bus I²C communication protocol using the pair of ports SCL and SDA, a serial clock signal is output at port SCL and also preset factory mode start data is output at port SDA in synchronism with the clock signal.

Alternatively, in serial data communication using the pair of ports TXD and RXD, the above described start data is output at data output port TXD.

By way of using Inter-Integrated Circuit Bus I²C protocol for communication purposes, for example, a process for setting a factory mode of operation is explained hereunder. The microcomputer 210 in the monitor 200 receives the factory mode start data output from the external microcomputer 110 at its port SDA in step 401, and then transmits received data back to the port SDA instep 403. This is to confirm that the communication channel is in good order. A buffer provided in the path of communication line connected between both ports SDA of the external microcomputer 110 and the microcomputer 210 of the monitor 200 is a bidirectional nature.

If a transmission of the start data from the microcomputer 210 to the external microcomputer 110 turns out to be unequal or incorrect, then an error process is performed in step 307. Otherwise, should it be determined that the above transmission clearly represents the same as the signal generated by the external microcomputer 110 in step 304, then the factory mode data is then subsequently transmitted to the microcomputer 210 in the monitor 200 in step 305. The factory mode timing data synchronized by the clock signal from the port SDA of the external microcomputer 110 is transmitted to the port SDA of microcomputer 210 when their factory mode starting data has returned from the microcomputer 210 and the factory mode starting data is transmitted to the microcomputer 210 according to the current status of the microcomputer 210.

The term used as factory mode timing data denotes and includes horizontal position H-POSITION, horizontal width H-WIDTH, vertical position V-POSITION, vertical size V-SIZE, pincushion, barrel, trapezoid, parallel vertical-linearity data, horizontal/vertical synchronizing frequency, polarity of synchronizing signal of a factory mode; resolution data and information data for monitor.

Consequently, the microcomputer 210 in the monitor 200 receives factory mode timing data from external microcomputer 110 and stores received data in a temporary buffer in step 404, and then send stored data again back to external microcomputer 110 in step 405. Thereafter, factory mode timing data already transmitted to the microcomputer 210 in the external microcomputer 110 is checked in step 306. The external microcomputer compares the factory mode timing data transmitted from external microcomputer 110 to the microcomputer 210 with the factory mode timing data returned from microcomputer 210 to the external microcomputer 110. With the result of the comparison that in the external microcomputer, the transmitted data to and the received data from the microcomputer 210 are not equal, then a subsequent error process procedure is carried out in stop 307. Otherwise, if the above two data are equal, the microcomputer 210 in the monitor 200 generates a signal of a low logic level at its chip select port CS1 so as to select memory 220, and then outputs received factory mode timing data at its data port DO so as to write the output data into a factory address area provided in the memory 300, in step 406.

On the other hand, the external microcomputer 110 inputs and determines whether a signal input indicates factory mode ending date transmitted from the microcomputer 210 in the monitor 200 in step 308, and if negatively determined, then causes the control of the routine to go back to repeatedly execute step 308. A conforming signal indicating the both transmitting and receiving data as being conformed by comparing their factory mode timing data transmitted from external microcomputer 110 to microcomputer 210 with the returned factory mode timing data transmitted from microcomputer 210 to external microcomputer 110, is transmitted from port SDA of external microcomputer 110 to the port SDA of microcomputer 210 in step 308 when the two factory mode timing data are same. If the result of the above described determination is positive, then the external microcomputer 110 generates factory mode end data, for example, a signal of OEEH in hexadecimal value, and transmits the generated data to the microcomputer 210 in the monitor 200 in step 309. Also, it is determined that the factory mode ending data is input from the microcomputer 210 and external microcomputer 110. Step 309 proceeds if the factory mode ending data is input from the port SDA of the microcomputer 210 to the port SDA of external microcomputer 110. External microcomputer 110 terminates the factory mode setting operation when the factory mode ending data is output from the port SDA of external microcomputer 110 to the port SDA of microcomputer 210 in step 309.

A predetermined other functions proceed in step 302 until product manufacturer inputs the factory mode storing signal through the key input 120 in external microcomputer 110 in step 302 when the factory mode storing signal has not been input by product manufacturer through the key input 120 in step 301. An error process indicates that the factory mode setting operation has not been completed and displaying the adder signal on the screen of the CRT 270 in step 307 when the factory mode starting mode has not been returned from the microcomputer 210 to external microcomputer 110 in step 304. The error message is displayed on the screen of the CRT 270 in step 307 when the factory mode timing data transmitted from external microcomputer 110 to microcomputer 210 are not same as that of the returned factory mode timing data transmitted from the microcomputer 210 to external microcomputer 110. The external microcomputer 110 transmits the factory mode timing data to microcomputer 210 in step 305 when the factory mode ending data has not been input from the port SDA of microcomputer 210 to the port SDA of external microcomputer 110 in step 308 and the factory mode timing data has not been transmitted from the external microcomputer 110 to the microcomputer 210.

A routine of receiving and storing factory mode data which goes back to step 404, is continuously repeated until factory mode ending data supplied from the external microcomputer 110 is received, and if received, then the microcomputer 210 ends the factory mode receiving operation in step 407.

During the above process, a display data adjusted by user manipulation after monitor 200 has been powered on is written into a use mode address in memory 220. Accordingly, when powered, the microcomputer 210 in the monitor 200 reads out data from data output port DO of the memory 220 via data input port DI of microcomputer 210 as to output user mode data stored in user mode addresses in the memory 220. When the monitor 200 is provided with an On Screen Display OSD function, the microcomputer 210 outputs a signal of a low logic level at its chip select port CS2 so as to select the On Screen Display Integrated Circuit OSD-IC 230 and then, in synchronism with the clock signal output at its port SCL, outputs at its port SDA a serial data signal responsive to user mode data. On Screen Display Integrated Circuit OSD-IC 230 outputs to mixer 940 red R, green G and blue B component signals responsive to user mode data supplied from the microcomputer 210, and in turn mixes the signals inputted with red R, green G and blue B signals from the video card 300 in a computer system (not shown) so as to output a mixed signal to the preamplifier 250.

The video signal input at an input terminal in the preamplifier 250 is amplified therein. The main amplifier 260 connected to the preamplifier 250 in cascade inputs the pre-amplified video signal, amplifying and then outputting an amplified signal to the cathode ray tube 270 such that a user setting mode of operation is able to be visually displayed on a screen 280 of a monitor 200. However, if no data is stored in any of addresses reserved for the user mode setting, then the microcomputer 210 reads out the factory mode data stored in the factory mode addresses in the memory 220 by transmission for storage from the external microcomputer 110 as inherent to a monitor 200 so as to visually display an image on the screen 280 of monitor 200 by using the factory mode data.

As described, the microcomputer 210 outputs factory mode data via the pair of ports SCL and SDA to the On Screen Display Integrated Circuit 230, and in turn, by sequential operations of the mixer 240, preamplifier 250 and main amplifier 260, enabling the cathode ray tube 270 to visually display an image on the screen 280 according to factory setting mode data.

FIG. 5A illustrates processes performed by the microcomputer 210 in the monitor 200. No data is stored in the factory mode address and the user mode address in the memory 220. The microcomputer 210 monitors whether the factory mode starting data is transmitted from the port SDA of external microcomputer 110 and received to the port SDA of the microcomputer 210. The factory mode starting data received by the microcomputer 210 is transmitted from the port SDA of microcomputer 210 to the port SDA of external microcomputer 110 in odder to conform the external microcomputer 110 that the data is completely transmitted and received by microcomputer 210 when the factory mode starting data has been input from the port SDA of external microcomputer 110 to the port SDA of the microcomputer 210. The factory mode timing data is generated from external microcomputer 110 and stored in a buffer of the monitor 200 in step 404. The factory mode timing data stored in the buffer of the monitor 200 is transmitted to port SDA of external microcomputer 110 from the port SDA of microcomputer 210 in step 405. A confirmation signal is transmitted from the port SDA of external microcomputer 110 to the port SDA of microcomputer 210 in step 406 when the factory mode timing data transmitted from external microcomputer 110 to microcomputer 210 is identical to the factory mode timing data returned from the microcomputer 210 to the external microcomputer 110 and both transmitting and receiving of the data between the microcomputer 210 and external microcomputer 110 have been completely conformed.

The address selecting signal as a low level generated from chip select port CS1 of the microcomputer 210 is fed to the chip select port SC of the memory 220, thereby the factory mode address is selected in the memory 220. The factory mode ending data generated from the port SDA of microcomputer 210 is fed to the port SDA of external microcomputer 1100 after the factory mode timing data is generated from the data output port DO of the microcomputer 210 to the data input port DI of the memory 220 and is stored in the factory mode address of the memory 220. Microcomputer 210 terminates the factory mode data receiving procedure when the factory mode ending data generated from the port SDA of the external microcomputer 110 is input to the port SDA of the microcomputer 210 in step 407. A predetermined other functions proceed during monitoring whether the factory mode starting data has been input from the external microcomputer 110 to the microcomputer 210 if the factory mode starting data has not been input from the external microcomputer 110 to the microcomputer 210 in step 401. Microcomputer 210 continues to monitor whether the factory mode ending data is input from the external microcomputer 110 to the microcomputer 210 within a predetermined period of time and returns to step 401 if the factory mode ending mode has not been input from the port SDA of the external microcomputer 110 to the port SDA of the microcomputer 210 within the predetermined period of time in step 407. In a preferred embodiment, if the factory mode ending mode has not been input from the port SDA of the external microcomputer 110 to the port SDA of the microcomputer 210 within the predetermined period of time in step 407, an error message is displayed on a screen 280 of the video stage in step 408 as shown in FIG. 5B. The user mode data input by product user through the key input 120 is stored in the user mode address of the memory 220 through the process similar to storing process of the factory mode timing data as explained above. After the monitor 200 is turned on, microcomputer 210 of the monitor 200 transmits the user mode data to on screen display integrated circuit OSD-IC 230 if the user mode data exists in the user mode address in the memory 220 when the microcomputer 210 reads data through the input port DI.

A low signal generated from the chip select port CS2 of the microcomputer 210 enables the on screen display integrated circuit OSD-IC 230 to operate. Serial data according to the user mode data generated from the microcomputer and synchronized by the serial data generated from the port SCL is fed to the OSD-IC 230 through the port SDA. OSD-IC 230 generates the R, G, and B signals according to the user mode data input from the microcomputer 210 to mixer 240. Mixer 240 generates the composite picture signal which is combined from R, G, and B signal from the video card 300 and the R, G, and B signals from the OSD-IC 230. The composite picture signal is fed to the preamplifier 250. The composite picture signal input to the preamplifier 250 is amplified by the preamplifier 250 and amplifier 260. A picture corresponding to the user mode data is displayed on the screen of the CRT 270.

The factory mode timing data stored in factory mode address of microcomputer 210 is displayed on the screen of the CRT 270 when the user mode data is not stored in the user mode address of the memory 220. As described above, the factory mode timing data is generated from the port SCL and SDA of the microcomputer 210 to OSD-IC 230, and a picture corresponding to the factory mode timing data is displayed through the mixer 240, preamplifier 250, and amplifier 260.

In a preferred another embodiment of the present invention, the factory mode starting data can be transmitted through the output port TXD and input port RXD of the external microcomputer 110 and the input port RXD and output port TXD of the microcomputer 210 instead of port SCL and SDA of the microcomputer 210 and external microcomputer 110 when the factory mode starting data, factory mode timing data, and the factory mode ending data are transmitted between the microcomputer 210 and external microcomputer 110. Serial interface communication method can be used instead of the I$^2$C bus protocol communication method.

The method and apparatus for setting factory mode of operation as contemplated and disclosed in the above explanation modifies respective timing data and factory mode date stored in an electrically erasable programmable read only memory incorporated by external control, as necessary, to establish communication channel with a microcomputer housed in a monitor for transmission of modified factory mode data by using either a serial interface or alternatively an Inter-Integrated Circuit Bus I$^2$C protocol and then writing transmitted data via the microcomputer into factory mode addresses provided in an electrically erasable programmable read only memory, thereby enabling a monitor to meet user requirements without modifying the program stored in the microcomputer, at a low cost and lessened time period.

As explained above, the factory mode timing data stored in the memory of the monitor can be changed by using the apparatus and a method of setting the factory mode, thereby product manufacturer are able to satisfy the product buyer with a variety of demand at a low cost and less period of the time. Furthermore, the expenses and the time for setting the factory mode timing data can be saved by changing the factory mode timing data without changing the program of the microcomputer. Moreover, a various types of the factory mode timing data can be selectively stored in the memory of the monitor by changing the factory mode timing data stored in the memory of the monitor.

While there have been illustrated and described what are considered to be embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments failing within the scope of the appended claims.

What is claimed is:

1. An apparatus for setting factory mode of operation in a display apparatus, comprising:
    an external controller disposed outside of said display apparatus, having a keyboard, an external microprocessor connected to said keyboard and receiving modified factory mode data from said keyboard, and an external memory connected to said external microprocessor and receiving and storing said modified factory mode data from said external microprocessor;
    a main microprocessor disposed within said display apparatus, connected to said external microprocessor and receiving said modified factory mode data transmitted from said external controller;
    a main memory disposed within said display apparatus, connected to said main microprocessor, having a factory mode address and a user mode address, storing initial factory mode data in said factory mode address and user mode data in said user mode address, deleting said initial factory mode data and storing said modified factory mode data received from said external controller into said factory mode address; and
    a video stage coupled to said main microprocessor, receiving one of said modified factory mode data and said user mode data, driving a screen representing said one of said modified factory mode data and said user mode data.

2. The apparatus of claim 1, with said main microprocessor comprised of a plurality of chip select ports, a first clock signal port and a first data signal port receiving said modified factory mode data from said external controller.

3. The apparatus of claim 2, with said main microprocessor transmitting said modified factory mode to said main memory through said first data signal port.

4. The apparatus of claim 1, with said main microprocessor comprised of a plurality of chip select ports, a first clock signal port and a first data signal port receiving said modified factory mode data from said external controller, transmitting said modified factory mode to said main memory through said first data signal port.

5. The apparatus of claim 4, with main memory coupled to first one of said chip select ports, having a second clock signal port coupled to said first clock signal port and a second data signal port coupled to said first data signal port, storing said modified factory mode data in said factory mode address in response to said first chip select port of said microprocessor.

6. The apparatus of claim 5, further comprised of a transmitter coupled to said external controller, transmitting said modified factory mode data stored in said external memory to said microprocessor.

7. The apparatus of claim 6, with said transmitter comprised of a third clock signal port and a third data signal port connected to said first clock signal port and a first data signal port of said main microprocessor respectively.

8. The apparatus of claim 5, with said external microprocessor comprised of a third clock signal port and a third data signal port connected to said first clock signal port and a first data signal port of said main microprocessor respectively.

9. The apparatus of claim 4, with said video stage coupled to said second one of said chip select ports, said clock port and said data signal port of said microprocessor, receiving one of said modified factory mode data and said user mode data, driving a screen representing said one of said modified factory mode data and said user mode data.

10. The apparatus of claim 1, with said main microprocessor comprised of an inter-integrated circuit bus communication protocol with a first clock signal port and a first data signal port and a serial data communication connected to said external microprocessor.

11. The apparatus of claim 1, with said main microprocessor comprised of an inter-integrated circuit bus communication protocol with a first clock signal port and a first data signal port connected to a second clock signal port and a second data signal port of said main memory.

12. The apparatus of claim 1, with said main microprocessor comprised of a buffer memory disposed between said external microprocessor and said microprocessor.

13. An apparatus for setting factory mode data in a display apparatus, comprising:
    a main microprocessor disposed within said display apparatus, receiving modified factory mode data transmitted from an external device disposed outside of said display apparatus, comprised of a plurality of chip select ports, a first clock signal port and a first data signal port;
    a main memory disposed within said display apparatus, having a factory mode address and a user mode address, storing initial factory mode data in said factory mode address and user mode data in said user mode address, coupled to first one of said chip select ports, having a second clock signal port coupled to said first clock signal port and a second data signal port coupled to said first data signal port, storing said modified factory mode data in said factory mode address in response to said first chip select port of said microprocessor, and
    a video stage coupled to said main microprocessor, receiving one of said modified factory mode data and said user mode data, driving a screen representing said one of said modified factory mode data and said user mode data.

14. The apparatus of claim 13, with said video stage coupled to said second one of said chip select ports, said clock port and said data signal port of said microprocessor, receiving one of said modified factory mode data and said user mode data, driving a screen representing said one of said modified factory mode data and said user mode data.

15. The apparatus of claim 13, with said main microprocessor comprised of an inter-integrated circuit bus communication protocol with said first clock signal port and said first data signal port and a serial data communication connected to said external device.

16. The apparatus of claim 13, with said microprocessor comprised of an inter-integrated circuit bus communication protocol with said first clock signal port and said first data signal port accommodating bidirectional transmission of timing data signals in synchronization with clock signals present at said first clock signal port.

17. The apparatus of claim 13, with said main microprocessor comprised of a serial data communication protocol with a data reception port and a data transmission port respectively accommodating reception and transmission of timing signals by said microprocessor.

18. The apparatus of claim 13, with said main microprocessor comprised of a plurality of buffer memories connected to said first clock signal port and said first data signal port, storing communication data received from said external device.

19. The apparatus of claim 13, with said external device comprised of a keyboard, an external microprocessor connected to said key board and receiving modified factory mode data from said keyboard, and an external memory connected to said external microprocessor and receiving and storing a modified factory mode data from said external microprocessor, transmitting said modified factory mode data stored in said external memory.

20. The apparatus of claim 19, with said external device comprised of a transmitter transmitting said modified factory mode data stored in said external memory to said microprocessor.

21. The apparatus of claim 20, with said transmitter comprised of a third clock signal port and a third data signal port connected to said first clock signal port and a first data signal port of said main microprocessor respectively.

22. The apparatus of claim 19, with said external microprocessor comprised of a third clock signal port and a third data signal port connected to said first clock signal port and a first data signal port of said main microprocessor respectively.

23. An apparatus for setting factory mode data in a display apparatus, comprising:

an external controller disposed outside of said display apparatus;

a keyboard disposed within said external controller;

an external microprocessor connected to said key board and receiving said modified factory mode data from said keyboard;

an external memory connected to said external microprocessor and receiving and storing a modified factory mode data from said external microprocessor, transmitting said modified factory mode data stored in said external memory to said display apparatus;

a main microprocessor disposed within said display apparatus, receiving modified factory mode data transmitted from said external controller;

a main memory disposed within said display apparatus, having a factory mode address and a user mode address, storing initial factory mode data in said factory mode address and user mode data in said user mode address, storing said modified factory mode data in said factory mode address in response to said microprocessor; and a video stage coupled to said main microprocessor, receiving one of said modified factory mode data and said user mode data driving a screen representing said one of said modified factory mode data and said user mode data.

24. The apparatus of claim 23, with said main microprocessor comprised of a plurality of chip select ports, a first clock signal port and a first data signal port.

25. The apparatus of claim 24, with said main microprocessor comprised of an inter-integrated circuit bus communication protocol with said first clock signal port and said first data signal port and a serial data communication connected to said external device.

26. The apparatus of claim 24, further comprised of said main memory being coupled to first one of said chip select ports, said clock port and said data signal port, storing said modified factory mode data in said factory mode address in response to said first chip select port of said microprocessor.

27. The apparatus of claim 26, with said video stage coupled to said second one of said chip select ports, said clock port and said data signal port of said microprocessor, receiving one of said modified factory mode data and said user mode data, driving a screen representing said one of said modified factory mode data and said user mode data.

28. The apparatus of claim 27, with said external controller comprised of a third clock signal port and a third data signal port connected to said first clock signal port and a first data signal port of said main microprocessor respectively.

29. The apparatus of claim 23, further comprised of a transmitter coupled to said external controller, transmitting said modified factory mode data to said main microprocessor.

30. The apparatus of claim 24, with said main microprocessor comprised of a plurality of buffer memories connected to said first clock signal port and said first data signal port, storing communication data received from said external device.

31. The apparatus of claim 24, with said main microprocessor comprised of a serial data communication connected to said external controller, receiving said modified factory mode data through said serial data communication.

* * * * *